United States Patent [19]

Flint et al.

[11] 4,146,824
[45] Mar. 27, 1979

[54] LOW SPEED SERVO CONTROL

[75] Inventors: John R. Flint, Barrington; K. George Rabindran, Morton Grove, both of Ill.

[73] Assignee: Bell & Howell Company, Chicago, Ill.

[21] Appl. No.: 836,629

[22] Filed: Sep. 26, 1977

[51] Int. Cl.² .............................................. H02P 1/56
[52] U.S. Cl. ......................................... 318/7; 318/72; 318/90; 242/184
[58] Field of Search ...................... 318/6, 7, 72, 90, 94; 242/184

[56] References Cited

U.S. PATENT DOCUMENTS

| 4,063,139 | 12/1977 | Miller | 318/7 X |
| 4,079,296 | 3/1978 | Dahlen et al. | 318/7 |

*Primary Examiner*—Benjamin Dobeck
*Attorney, Agent, or Firm*—Harry G. Thibault; Alan B. Samlan

[57] ABSTRACT

A control system is described for use in a web transport in which a web is advanced from a supply spool to a take-up spool by a pair of drive motors, the latter of which are actuated by a servo control. The system includes a variable gain network which enhances the gain of the servo system at very low speeds without sacrificing system stability at higher speeds, and a circuit for adding a hold-back torque to the motor driving the take-up spool to smooth its rotation under low torque conditions. In addition, the system includes a device for inhibiting the rotation of the spools when an operator has removed the web from the spools, thereby preventing the servo control from rotating the spools in an uncontrolled manner in response to inadvertent operator movement of one of the spools.

14 Claims, 6 Drawing Figures

LOW SPEED SERVO CONTROL

BACKGROUND OF THE INVENTION

This invention relates generally to web transport systems and is particularly directed to a speed control for a web transport system wherein a web is advanced between a pair of rotating spools at speeds which include high speeds and very low speeds.

It has been proposed to control the speed of transport of a web from a supply spool to a take-up by providing a pair of servo generators, each driven by one of the spools, and continuously and algebraically summing the outputs of the servo generators with a derived control voltage which is proportional to the sum of the desired speeds of the two spools. The summed signal constitutes a motor drive signal which is selectively applied to a drive motor associated with the take-up spool, another motor associated with the supply spool remaining de-energized. Such a system is described in application Ser. No. 801,703, filed May 26, 1977, and assigned to the assignee of the present invention. Suffice it to say that such a system continuously reacts to variations in the speed of the spools so as to drive the spools at respective speeds whose sum is constant and proportional to the control voltage. As a result, the web is advanced between the spools at a maximum speed which is substantially less than the maximum speed of prior systems while yet advancing the entire web from the supply spool to the take-up spool in the same transport time as prior systems.

Although the above-described web transport system has been found to provide superior control over the speed of a web transport, it has been found that that system can be improved for operation at very low transport speeds at which the motion of the web is barely noticeable. This is particularly important in microfilm retrieval systems in which it is desirable to transport the film at high speeds to roughly locate a particular microfilm frame and to transport the film at very low speeds to more precisely position the frame in question.

At very low spool speeds, one fourth of a revolution per minute, for example, the gain of the servo control system becomes very low. To increase the over-all gain of the servo system to accommodate such low speeds would result in too much gain at high speeds and possible system instability.

Another problem which occurs at very low speeds is that the motors which drive the spools tend to rotate in a jerky motion. This is particularly noticeable when one of the motors operates at very low speeds in which its IR (current times resistance) drop is greater than its back EMF (electromotive force).

Accordingly, although the servo control system described in the above-identified application is satisfactory for low and high speeds of operation, the above-described problems render it less satisfactory, though operable, at very low speeds.

OBJECTS OF THE INVENTION

It is a general object of the invention to provide an improved servo control system for a web transport system.

It is a more specific object of the invention to provide such a servo control which exhibits high gain at very low spool speeds without sacrificing system stability.

It is a further object of the invention to provide such a servo control for driving the spools smoothly at very low speeds.

BRIEF DESCRIPTION OF THE DRAWINGS

The above and other objects of the invention are more particularly set forth in the following detailed description and in the accompanying drawings of which.

DESCRIPTION OF THE PREFERRED EMBODIMENT

The invention described herein is a control circuit preferably used in connection with a servo control for a web transport system in which a pair of drive motors advance a web from a supply spool to a take-up spool. The web transport system will preferably include a pair of servo generators which generate outputs representative of the speed and direction of rotation of the spools. In such a system, the outputs of the servo generators are algebraically summed with a variable control voltage representative of the derired speed and direction of rotation of the spools. The resultant summed signal is a composite motor drive signal for energizing the motor associated with the take-up spool. The motor associated with the supply spool is not energized but is rotated by the supply spool, the latter being rotated by virtue of the pull of the web.

In order to operate such a system at very low speeds at which the outputs of the generators have correspondingly low amplitudes, the gain of the servo system is, in accordance with the invention, increased at very low speeds without increasing its gain at higher speeds, thereby enhancing the resolution of the servo system at very low speeds without sacrificing system stability at higher speeds.

In general, the variation in system gain is accomplished by algebraically summing the outputs of the servo generators and amplifying the summed outputs whose magnitudes are less than a predetermined magnitude. Summed servo generator outputs which exceed the predetermined magnitude are amplified to a lesser extent or preferably not at all. By selecting the predetermined magnitude to correspond to spool speeds at which the servo generators begin to develop relatively large, usable outputs, only the smaller servo generator outputs are amplified and the range over which the servo system can track is greatly enhanced.

Two additional aspects of this invention are particularly useful with the above-described type of servo system. The first aspect relates to a timing control for removing the motor drive signal from the drive motors a predetermined interval after the control voltage is adjusted to stop the motors. With the drive motors thus inhibited from being energized, an operator may remove the web from the spool without fear of causing the servo system to drive the motors should either of the spools be inadvertently moved. Without the timing control, the decoupling of the spools by the removal of the web from the spools and inadvertent movement of one of the spools tends to cause the servo system to rotate the spools in an uncontrollable manner.

The second additional aspect of the invention relates to a device for smoothing the rotation of the take-up motor, that is, the motor driving the take-up spool, at very low speeds. Typically, the take-up motor must initially provide enough torque to overcome the starting friction (stiction) of the system when the system is at rest. Once the system begins running at a low speed, the take-up motor develops less torque due to the fact that the running friction is less than the starting friction. Under this condition, the varying torque requirements of the take-up motor tend to cause the servo system to drive the take-up motor in a jerky motor.

This tendency of the take-up motor to rotate in a jerky manner is overcome in general, by a device which senses the torque of the take-up motor and develops a control signal when that torque is less than predetermined low value. In response to the control signal, a predetermined amount of hold-back torque is supplied to the supply motor (the motor associated with the supply spool). An equivalent amount of hold-back torque is applied to the take-up motor via the web which is coupled between the take-up spool and the supply spool. As a result, the take-up motor is forced by the servo system to overcome the hold-back torque and rotates smoothly until its speed increases to a point where its torque exceeds the predetermined low value of torque, whereupon the hold-back torque is removed.

In a preferred embodiment, the above-described amplification of the servo generator outputs is combined in a control system with the application of hold-back torque to the supply motor. This combination acts to further inhibit oscillation of the system at low motor speeds by virtue of the fact that the application of the hold-back torque alters to loop gain of the system in a way which compensates for the increased loop gain of the system provided by the amplification of the servo generator outputs. As a result, the servo system is able to track at very low speeds and yet oscillation of the system is entirely avoided.

Figure 1:
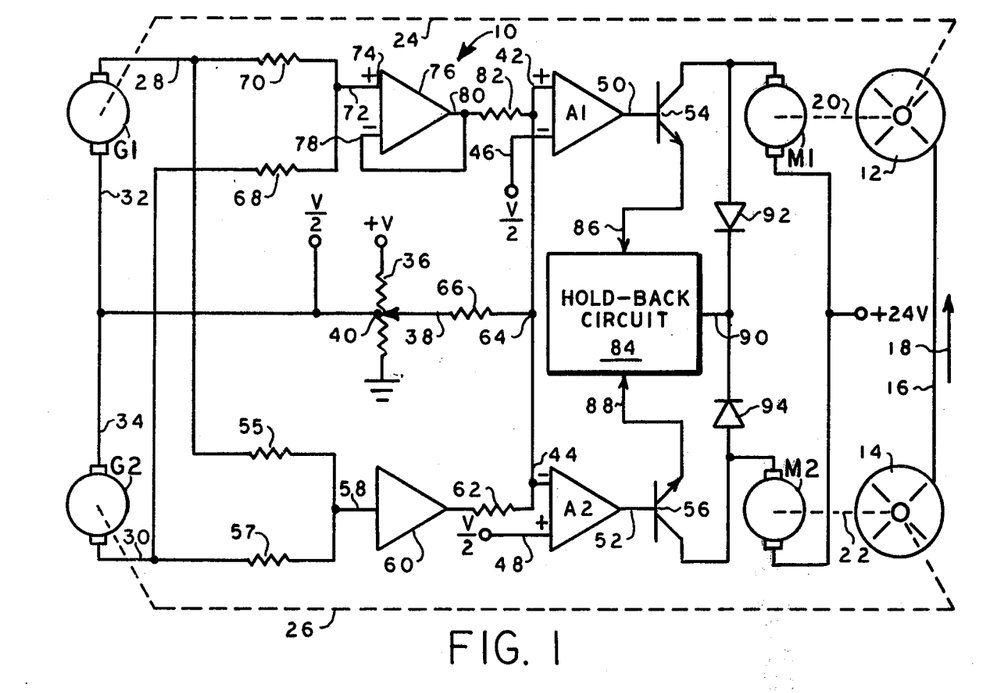
FIG. 1 schematically illustrates a web transport and control circuit therefor embodying various aspects of the invention.

Referring now to FIG. 1, there is shown schematically a web transport system 10 incorporating a non-linear gain servo control and a hold-back circuit for smoothing the rotation of the take-up motor at low speeds. Aside from the non-linear servo control and the hold-back circuit, the web transport system 10 operates substantially as described in the aforementioned patent application, the teachings of which are incorporated herein. As shown, the system includes a pair of spools 12 and 14 between which a web 16 is wound. When the web 16 is being advanced in the direction of the arrow 18, the spool 12 is functioning as a supply spool. When the web is advanced in the opposite direction, the functions the two spools are reversed.

Each of the spools 12 and 14 is driven by a drive motor, the spool 12 being driven by the motor M1 via a shaft 20 and the spool 14 being driven by the motor M2 via a shaft 22.

In order to generate an indication of the direction and speed of rotation of the spools 12 and 14, the spool 12 is coupled to a servo generator G1 via a shaft or linkage 24 and the spool 14 is coupled to a servo generator G2 via another shaft or linkage 26. The servo generators G1 and G2 have respective output terminals 28 and 30 at which voltages appear representative of the speed and direction of rotation of the spools 12 and 14. The servo generators G1 and G2 also include terminals 32 and 34, respectively, which are coupled to a reference voltage indicated herein as V/2. Thus, the servo generator outputs appearing at the terminals 28 and 30 will be either positive or negative with respect to the reference voltage. A servo generator output which is positive with respect to the reference voltage is indicative of spool rotation in a first direction, whereas a servo generator output whose polarity is negative with reference to the reference voltage is indicative of spool rotation in the opposite direction.

In order to generate a control voltage indicative of the desired direction and speed of rotation of the spools 12 and 14, a variable resistor 36 is coupled between a source of voltage indicated as +V and ground. The resistor 36 includes a wiper arm 38 at which the control voltage is present. The resistor 36 further includes a fixed terminal 40 at which one half the voltage V is always present. By moving the wiper arm 38 above or below the central point to which the terminal 40 is connected, the control voltage on the wiper arm 38 may be made either positive or negative with respect to the reference voltage V/2. When the control voltage at the wiper arm 38 is positive with respect to the reference voltage, the spools 10 and 12 will be caused to rotate in one direction and when the voltage at the wiper arm 38 is negative with respect to the reference voltage, the spools 10 and 12 will be caused to rotate in the opposite direction.

In the embodiment described in the aforementioned patent application, the control voltage present at the wiper arm 38 is continuously and algebraically summed with the outputs of the servo generators G1 and G2 so as to develop a composite motor drive signal for application to the motors M1 and M2. To energize a selected one of the motors M1 and M2, the composite motor drive signal is, in that embodiment, applied to the signal input terminals of a pair of amplifiers such as amplifiers A1 and A2. The positive input terminal 42 of the amplifier A1 and the negative input terminal 44 of the amplifier A2 are representative of those signal input terminals.

To make each amplifier A1 and A2 responsive only to signals of a given polarity, a negative input terminal 46 of the amplifier A1 and a positive input terminal 48 of the amplifier A2 are connected to the reference voltage V/2. Output terminals 50 and 52 of the amplifiers A1 and A2 are coupled respectively to the motors M1 and M2 through a pair of power transistors 54 and 56 as shown. Thus, when the composite motor drive signal is positive with respect to the reference voltage V/2, the amplifier A1 conducts and drives the motor M1 in a given direction until it reaches a steady state speed corresponding to the control voltage selected by the wiper arm 38. Likewise, when the composite motor drive signal is negative with respect to the reference voltage V/2, the amplifier A2 conducts and drives the motor M2 in the opposite direction until it reaches its steady state speed. Further details of operation and advantages of such a servo control are described in the aforementioned patent application.

In order to increase the gain of the servo system at very low speeds according to this invention, output signals from the generators G1 and G2 which are very low in amplitude are amplified prior to their being summed with the control voltage on the wiper arm 38, while the outputs of the generators G1 and G2 which are of a larger magnitude are amplified to a much lesser extent, or preferably not at all, prior to their summing with the control voltage. The structure for effecting the two levels of gain includes a first summing network comprising the resistors 55 and 57 which are coupled to the output terminals 28 and 30, respectively, of the servo generators G1 and G2. The summed output of the generators G1 and G2 appears at the lead 58 which is coupled to the input of a saturable amplifier 60. The saturable amplifier 60 is designed to substantially linearly amplify the summed signals appearing on the lead 58 when the magnitudes of both signals is less than a predetermined magnitude. When the magnitude of the signals on the lead 38 is equal to or greater than the predetermined magnitude, the amplifier 60 saturates, thereby providing no further amplification.

The signals which are amplified by the amplifier 60 are coupled via a resistor 62 to a common terminal 64 to which the control voltage appearing on the wiper arm 38 is also coupled via a resistor 66. By this arrangement, the summed signals which are amplified by the amplifier 60 are continuously and algebraically summed at the common terminal 64 to provide a composite motor drive signal which is applied to the positive input terminal 42 of the amplifier A1 and to the negative input terminal 44 of the amplifier A2.

A second summing network comprising resistors 68 and 70 provides a path for servo generator outputs whose magnitude exceeds that which can be applified by the amplifier 60. The resistor 68 is coupled to the output terminal 30 of the servo generator G2 and the resistor 70 is coupled to the output terminal 28 of the servo generator G1. The summed outputs of the generators G1 and G2 appear at the lead 72 which is coupled to the positive input terminal 74 of a unity gain amplifier 76. A negative input terminal 78 of the amplifier 76 is connected to an output terminal 80 of the amplifier 76 in the usual manner to effect unity gain in the amplifier 76.

The summed outputs of the servo generators G1 and G2 which pass through the amplifier 76 are coupled to the common terminal 64 via a resistor 82 for algebraic summation with the control voltage appearing at the wiper arm 38. Hence, when the spools 12 and 14 are rotated at very low speeds so that the servo generators G1 and G2 have correspondingly low magnitude outputs, the composite motor drive signal at the common connection 64 consists of the algebraic summation of the control voltage appearing at the wiper arm 38 and the summed and amplified servo generator outputs on the amplifier 60. When the spools 12 and 14 are rotating at higher speeds such that the generators G1 and G2 develop outputs whose magnitudes are greater than the predetermined magnitude at which the amplifier 60 is designed to saturate, the composite motor drive signal on the common terminal 64 will consist of the algebraic summation of the control voltage on the wiper arm 38 and the summed outputs of the servo generators G1 and G2 which pass through the unity gain amplifier 76. Because only those servo generator outputs which are smaller than a predetermined magnitude become amplified, the stability of the over-all system is not diminished at higher spool speeds at which such amplification would be detrimental to system stability.

As described above, the composite motor drive signal appearing at the common terminal 64 is applied to the amplifiers A1 and A2, only one of which will conduct at any given time, depending on the polarity of the composite motor drive signal. When the composite motor drive signal is positive with respect to the reference voltage V/2, the amplifier A1 conducts and drives the motor M1 through the power transistor 54. When the composite motor drive signal is negative with respect to the reference voltage V/2, the amplifier A2 conducts and drives the motor M2 through the power transistor 56. This latter operation, that is, the selective energization of the motors M1 and M2 by the amplifiers A1 and A2 is substantially as described in the aforementioned patent application.

Figure 2:
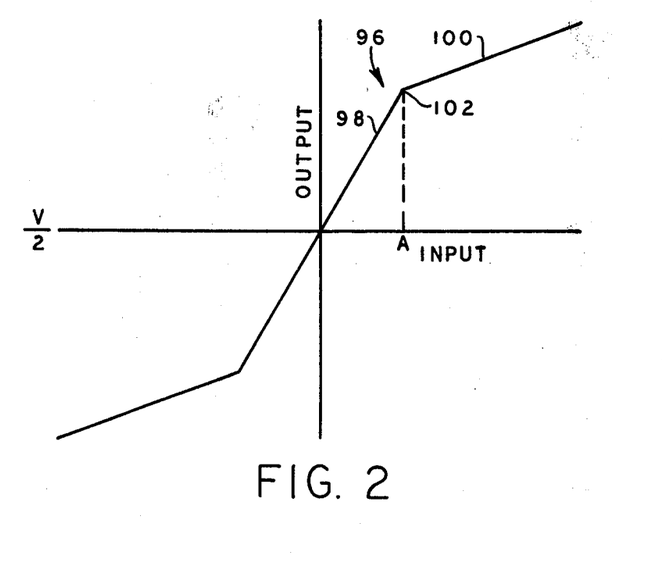
FIG. 2 is a graphic illustration useful in describing the operation of the control circuit of FIG. 1.

Referring now to FIG. 2, there is shown a graphic illustration of the gain control exerted by the saturable amplifier 60, the unity gain amplifier 76, and the two summing networks comprising the resistors 55, 57, 68 and 70. The curve 96 illustrates the sum of the outputs of the amplifiers 60 and 76 through the resistors 62 and 82 versus their inputs from the servo generators G1 and G2. As shown, curve 96 has a first portion 98 which is relatively steep and a second portion 100 of a lesser slope. The first portion 98 illustrates the relatively high gain of the servo system for servo generator outputs which are amplified by the amplifier 60, while the second portion 100 of the curve 96 illustrates the gain of the system after the amplifier 60 has saturated. The transition point 102 between portions 98 and 100 of the curve 96 indicates the point where the outputs of the servo generators G1 and G2 begin to exceed the predetermined magnitude A at which the amplifier 60 saturates. Typically the predetermined magnitude may be in the order of from 0.05 to 0.5 volts.

As will be described more fully hereinafter, the transfer function illustrated in FIG. 2 is of importance in determining the over-all loop gain of the system. Such over-all gain is preferably modified by a hold-back circuit in a manner which further ensures that the system remains stable at low speeds and which causes the motors to rotate smoothly.

Referring again to FIG. 1, there is shown schematically a hold back circuit 84 for sensing the torque generated by the energized motor and for providing a hold-back torque to the unenergized motor when the torque associated with the energized motor is below a predetermined value. The hold-back torque is transferred to the energized motor in a manner set forth below. As shown, the hold-back circuit 84 has input terminals 86 and 88 for sensing the current through the transistors 54 and 56, which current is substantially identical to the current through the motors M1 and M2 and is indicative of the torque associated with those motors. An output terminal 90 of the hold-back circuit 84 is coupled via diodes 92 and 94 to the motors M1 and M2, respectively, coupling a torque-generating current to a selected one of the motors. Specific construction details and operation of the hold-back circuit 84 is described hereinafter.

Figure 3:
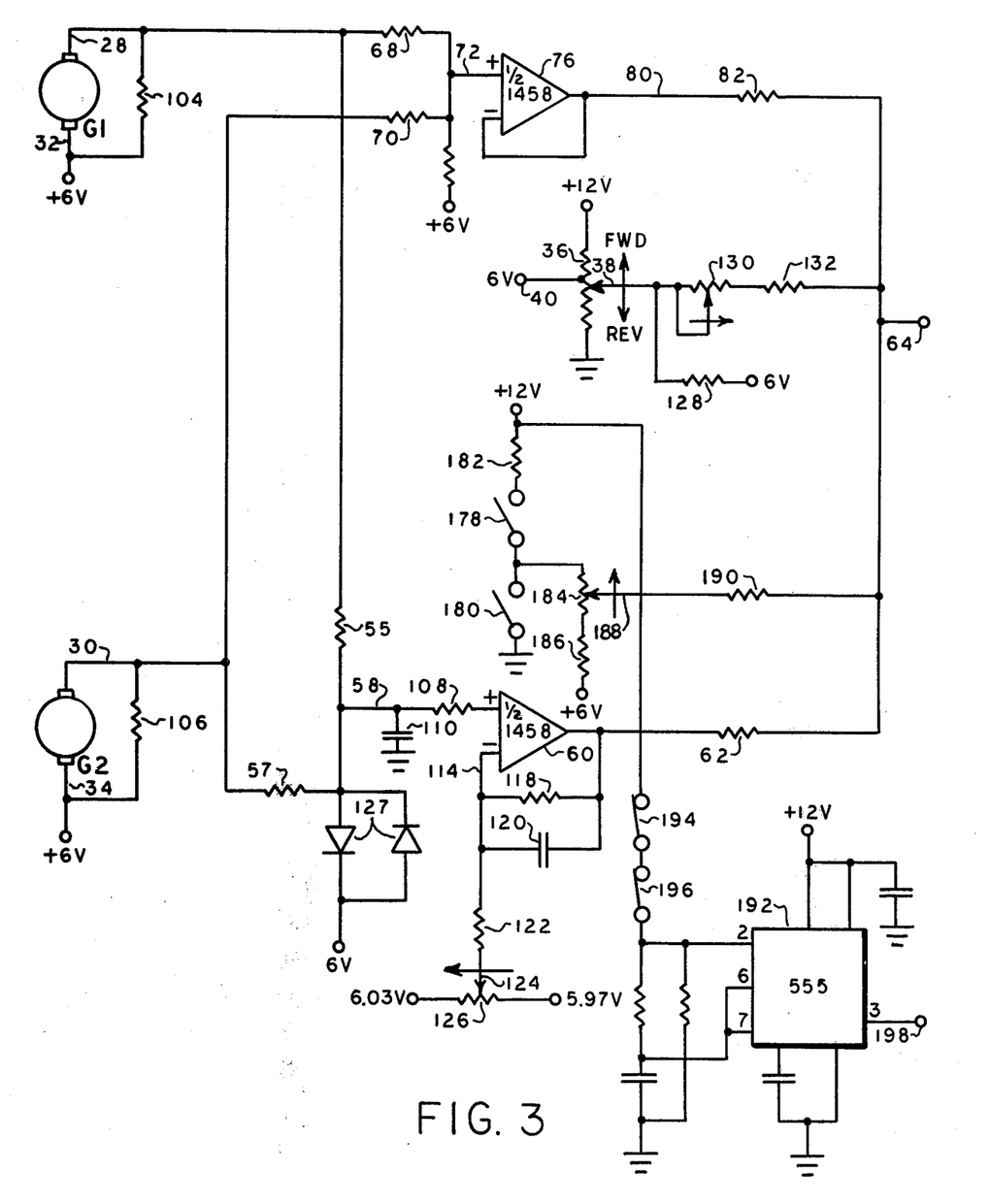
FIGS. 3 and 4 are more detailed circuit drawings of the system illustrated in FIG. 1, further including a device for inhibiting the rotation of the spools.
Figure 4:
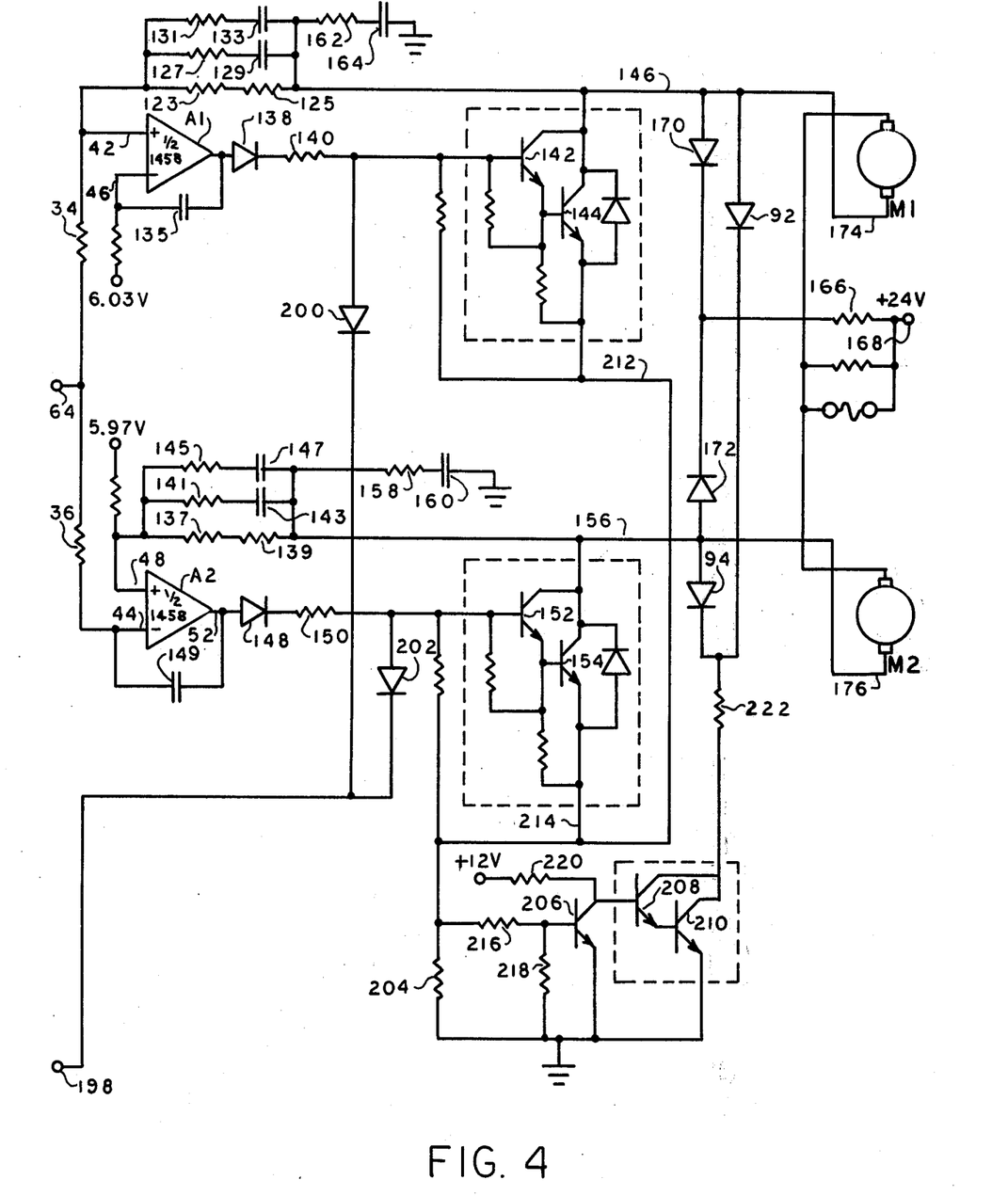

A more detailed circuit diagram of the apparatus shown in FIG. 1 is illustrated in FIGS. 3 and 4 wherein the elements of the latter figures which correspond to similar elements of FIG. 1 are given like reference symbols. In addition, several of the illustrated elements include their commercial identifying numbers and their pin numbers. In the circuitry illustrated in FIGS. 3 and 4, the voltage which corresponds to the voltage V of FIG. 1 is 12 volts. Accordingly, the reference voltage in the circuitry of FIGS. 3 and 4 is 6 volts.

Beginning at the left of FIG. 3, the generator G1 is shown with the terminal 32 coupled to the 6 volt reference voltage and its terminal 28 coupled to the resistor 55 of the first summing network and to the resistor 68 of the second summing network. Also coupled to the terminal 28 of the generator G1 is a resistor 104 which is coupled to the 6 volt supply.

The generator G2 is shown with its terminal 34 connected to the 6 volt power supply and terminal 30 connected to the resistor 57 of the first summing network and the resistor 70 of the second summing network. The terminal 30 of the generator G2 is also coupled to the 6 volt supply through a resistor 106.

The outputs of the first and second summing networks are coupled via the leads 58 and 72, respectively, to the saturable amplifier 60 and to the unity gain amplifier 76, the output of the amplifier 60 being coupled to the common terminal 64 via resistor 62. At the input to the amplifier 60 there is a resistor 108 between the lead 58 and the positive input terminal of the amplifier 60. At the junction between the lead 58 and the resistor 108, a capacitor 110 is coupled to ground to provide a path to ground for noise. Between the negative input terminal 114 and the output terminal 116 of the amplifier 60 there is coupled in parallel combination a resistor 118 and a capacitor 120, the latter of which serves to provide high frequency stability. Also connected to the negative input terminal 114 of the amplifier 60 is a resistor 122 coupled to a wiper arm 124 of a variable resistor 126. The resistors 118 and 122 serve to adjust the gain of the amplifier 60. The variable resistor 126, coupled as shown between a 5.97 volt and a 6.03 volt source serves as a minimum speed balance control and is described in more detail hereinafter.

To protect the amplifier 60 from being overdriven by large amplitude signals which prevent it from recovering in time to handle smaller amplitude signals, a pair of diodes 127 are coupled between a 6 volt source and the lead 58 and poled in opposite directions as shown.

As in FIG. 1, the control voltage is developed on the wiper arm 38 of the resistor 36, the latter of which is coupled between a 12 volt supply and ground. The 6 volt reference voltage is taken at the terminal 40 which is coupled to the midpoint of the resistor 36. The wiper arm 38 is coupled to a 6 volt supply through a resistor 128 and to the common terminal 64 through a variable resistor 130 and a fixed value resistor 132, which together function as resistor 66 of FIG. 1. The resistor 130 is made variable in order to set the maximum sum of the speeds of rotation of the spools 12 and 14.

As shown, the resistors 82, 132 and 62 are coupled to the common connection 64 at which the composite motor drive signal is developed. The common connection 64, is in turn, coupled to the signal input terminal of the amplifier A1 through a resistor 134 (FIG. 4) and is coupled to the input signal terminal 44 of the amplifier A2 via a resistor 136. The output of the amplifier A1 is coupled via a diode 138 and a resistor 140 to a driver comprising transistors 142 and 144 and their associated circuitry for delivering via their output lead 146 a voltage of sufficient amplitude for driving the motor M1.

The gain of the amplifier A1 is controlled by a pair of resistors 123 and 125 which are serially coupled between the input terminal 42 of the amplifier A1 and the collectors of the transistors 142 and 144. In parallel with the resistors 123 and 125 in a series combination of a resistor 127 and a capacitor 129 and another series combination of a resistor 131 and a capacitor 133, all of which correct the phase shift of the system to maintain stability. The stability of the system is further controlled by a capacitor 135 coupled between the input terminal 46 of the amplifier A1 and its output terminal 50.

The output of the amplifier A2 is coupled via a diode 148 and a resistor 150 to a driver comprising transistors 152 and 154 and their associated circuitry. The output of the transistors 152 and 154 is coupled via a lead 156 to the motor M2.

The gain of the amplifier A2 is controlled similarly to that of amplifier A1 by a pair of resistors 137 and 139 coupled between the input terminal 48 of the amplifier A2 and the collectors of the transistors 152 and 154. In parallel with the resistors 137 and 139 is a series combination of a resistor 141 and a capacitor 143 and another series combination of a resistor 145 and a capacitor 147, all of which correct the phase shift of the system to maintain stability. The stability of the system is further controlled by a capacitor 149 coupled between the input terminal 44 of the amplifier A2 and its output terminal 52.

To further correct the phase shift of the servo system for high frequency stability, the lead 156 is connected to ground via a resistor 158 and a capacitor 160. Similarly, the lead 146 is also connected to ground through a resistor 162 and a capacitor 164, the latter of which also serve to correct the phase shift of the servo system for high frequency stability.

When a substantial portion of the web has been transported from the supply spool to the take-up spool, the load on the motor driving the take-up spool, motor M1, for example, increases dramatically and approximately as the square of the speed of its rotation. Should the motor M1 continue rotating at a high speed and under such a high torque condition until all of the available web is wound on the take-up spool, an excessive amount of tension would be placed on the web when the latter abruptly brakes the take-up spool because the trailing edge of the web remains attached to the supply spool. Such tension may, in fact, break the web. Thus, the motor driving the take-up spool should be braked to avoid breaking the web prior to the motor M1 coming to a stop as a result of all the available web having been wound on the take-up spool. To achieve such braking, a resistor 166 is coupled between a terminal 168 to which a 24 volt power supply is supplied and one side of a pair of diodes 170 and 172. The other side of the diodes 170 and 172 are connected to the terminals 174 and 176 of the motors M1 and M2, respectively. In operation, and assuming that the motor M1 is driving the take-up spool and the motor M2 is being rotated by the supply spool, the motor M2 will eventually reach a speed at which its back EMF (electromotive force) is sufficient to forward bias the diode 172. When that condition occurs, the terminal 176 of the motor M2 will be coupled to the 24 volt supply appearing at terminal 168 via the diode 172 and the resistor 166. This effectively places the resistor 166 across the motor M2, as a result of which the current flowing from the motor M2 through the resistor 166 develops a hold-back torque in the motor M2, thereby reducing its speed as well as the speed of the motor M1 by virtue of the coupling between spools by the web. Consequently, the system is slowed prior to the available web being fully wound on the motor M1.

When the motor M2 drives the take-up spool and the motor M1 is rotated by the supply spool, the back EMF developed by the motor M1 will forward bias the diode 170 to place the resistor 166 across the motor M1, thereby developing a hold-back torque in the latter motor which slows the rotation of the motors M1 and M2 to a speed which will not put undue stress on the web when it becomes fully wound on the take-up spool.

Referring again to FIG. 3, there is shown a pair of micro-switches 178 and 180 coupled in series between ground and a 12 volt supply by a resistor 182. The micro-switches 178 and 180 are mechanically coupled to a joystick (not shown) which moves the wiper arm 38 to select a control voltage from the resistor 36. When the wiper arm 38 is centered on the resistor 36 so that the voltage on the wiper arm 38 is substantially equal to 6 volts, the micro-switches 178 and 180 are in the open positions shown. When the joystick is moved such that the wiper arm 38 is adjusted to pick off a control voltage for advancing the web in a forward direction, the microswitch 178 closes. Similarly, when the joystick is moved to position the wiper arm 38 for picking off a control voltage for advancing the web in the opposite direction, the microswitch 178 opens again and the micro-switch 180 closes. Thus, the micro-switch 178 is closed only when the web is being advanced in a forward direction and the micro-switch 180 is closed only when the web is being advanced in a reverse direction.

The function of the micro-switches 178 and 180 is to ground a variable resistor 184 when the web is being advanced in a reverse direction and to couple the resistor 184 to the 12 volt supply through resistor 182 when the web is being advanced in the forward direction. With the resistor 184 coupled to a 6 volt supply through a fixed value resistor 186 as shown, a wiper arm 188 on the variable resistor 184 may be set to pick off a predetermined voltage and apply that voltage through a resistor 190 to the common terminal 64 to set a minimum speed of rotation of the motors M1 and M2 in either the forward or reverse mode of operation.

Referring again to the variable resistor 126 which is coupled to the negative terminal 114 of the amplifier 60, this resistor and its wiper arm 124 are used to adjust the quiescent output voltage of the amplifier 60 to compensate for voltage offsets in the system, such as voltage offsets in the amplifiers A1 and A2 which result from imperfect balancing. Preferably, the wiper arm 124 is adjusted such that the output voltage of the amplifier 60 compensates for such system offsets so that the minimum speed of rotation of the motors M1 and M2 in both directions is the same.

As indicated previously, it is desirable to inhibit further rotation of the spools once they have been stopped and an operator removes the web from the spool. Under some circumstances, and with the servo system energized, inadvertent movement of either of the spools after the web has been removed from them will generate a signal which the servo generators may act upon for rotating the spools in an uncontrolled manner, even though the operator has set the control voltage to stop the motors M1 and M2. To prevent such uncontrolled rotation of the spools, there is included a timer 192 (FIG. 3) which responds to the control voltage being of a value which is intended to stop the rotation of the spools. The response of the timer 192 inhibits the composite motor drive signal from driving either motor after a predetermined interval subsequent to the control voltage being set to that value.

The operation of the timer is initiated by the closure of a pair of micro-switches 194 and 196 which are serially coupled between pin 2 of the timer 192 and the 12 volt supply. The microswitches 194 and 196 are mechanically coupled to the joystick (not shown) which controls the movement of the wiper arm 38. When the joystick is positioned such that the wiper arm 38 picks off 6 volts from the resistor 36, motors M1 and M2 will stop and the micro-switches 194 and 196 will be urged to their closed positions as shown for actuating the timer 192. The output of the timer 192 appears at its pin 3 which is coupled to the terminal 198, the latter of which is coupled to the outputs of the amplifiers A1 and A2 via the diodes 200 and 202, respectively. A few seconds after the micro-switches 194 and 196 close, the timer develops a signal at its output pin 3 which clamps the outputs of the amplifiers A1 and A2 to a low level to inhibit energization of either of motors M1 or M2. After the clamping action has occurred, an operator may remove the web from the spools without fear that any subsequent inadvertent movement of the spools will result in their uncontrolled rotation by the operation of the servo system.

As has been briefly described above with reference to FIG. 1, a hold-back circuit is provided which supplies a hold-back torque to the motors M1 and M2 when the motor associated with the take-up spool is rotating at a very low speed and in a low torque condition.

The application of such hold-back torque provides two very desirable results — it causes the motors to rotate smoothly at very low speeds despite the varying torque requirements associated with the transition between a stopped condition and a low speed condition, and it provides an improved over-all loop gain (greater stability) for the system at low speeds. The hold-back circuit will first be described in terms of its function of causing the motors to rotate smoothly at low speeds, after which its modification of the system's loop gain will be described.

Referring now to FIG. 4, the hold-back circuit includes a resistor 204 for sensing the current through the motors M1 and M2, a transistor 206 for developing a control signal when the current through the resistor 204 is less than a predetermined low value, a pair of transistors 208 and 210 for supplying a torque-generating current to the motors M1 and M2, and a pair of diodes 92 and 94 for conducting that current only to the motor associated with the supply spool.

More specifically, one end of the resistor 204 is coupled via leads 212 and 214 to the emitters of transistors 144 and 154, respectively. The other end of the resistor 204 is grounded. Thus, when the motor M1 is energized, its current flows from its terminal 174, through the lead 146, the transistors 142 and 144, and the lead 212 to ground through the resistor 204. Similarly, when the motor M1 is energized its current flows from its terminal 176 to ground through the lead 156, transistors 152 and 154, lead 214 and the resistor 204. Thus, the resistor 204 senses the current through the energized motor and develops a corresponding voltage thereacross. Because motor torque is proportional to motor current, the voltage developed by the resistor 204 is proportional to the torque of the energized motor.

A predetermined fraction of the voltage developed across the resistor 204 is coupled to the base of the transistor 206 by a voltage divider comprising the resistors 216 and 218, the latter of which is coupled between ground and the base of the transistor 206. When the voltage across the resistor 204 is below a predetermined magnitude, the transistor 206 remains non-conductive. This condition is indicative of the energized motor being in a very low torque condition. Consequently, the transistor 206 remains off and its collector, which is coupled to a 12 volt source through a resistor 220, remains at a high voltage level. This high voltage level at the collector of the transistor 206 is, in effect, a control signal indicating that the energized motor is operating in a very low torque condition.

In response to the control signal at the collector of the transistor 206, the transistors 208 and 210 are rendered conductive, whereupon and additional current flows through the motor M2 (assuming that it is the unenergized motor which is being rotated by the supply spool), the lead 176, the diode 94, an impedance in the form of a resistor 222, and to ground through the transistors 208 and 210.

The additional current now flowing through the motor M2 as a result of its back EMF creates a hold-back torque on that motor, which torque is transmitted to the motor M1 by virtue of the shafts linking the motors to their spools and the web coupled between the spools. As a result, the motor M1 is provided with a hold-back torque, forcing it to draw more current than it otherwise would. Consequently, the motor M1 rotates smoothly throughout this otherwise low torque condition until it reaches a higher speed at which it rotates smoothly and without the need for hold-back torque.

When the motor M1 reaches such a higher speed (and a higher torque condition), the current through the resistor 204 increases to the point where the transistor 206 is rendered conductive. When this occurs, the voltage at the collector of the transistor 206 falls (i.e., the control signal disappears), the transistors 208 and 210 turn off, and the additional current is removed from the motor M2. Thus, the transistors 208 and 210 act essentially as an electronic analog switch which opens and closes in response to the absence and presence of the control voltage at the collector of the transistor 206.

The illustrated embodiment of the hold-back circuit responds to a low torque condition in either of the motors M1 and M2, regardless of which motor is energized for rotating the spool serving as the take-up spool, because the resistor 204 is commonly connected to both motors. With only one motor being actively driven at any given moment, the voltage across the resistor 204 must necessarily reflect the current (and torque) associated with the driven motor.

In addition, the illustrated hold-back circuit will always supply additional current only to the motor being rotated by the supply spool. The latter is accomplished by virtue of one terminal of each of the motors M1, M2 being coupled to a constant supply voltage (24 volts at terminal 168), the other terminals 174, 176 being coupled, respectively, to the diodes 92 and 94, and the diodes 92 and 94 being poled as shown such that the electronic switch (transistors 208 and 210), couples the resistor 222 only to the motor associated with the supply spool. This effect is more evident by considering the motor M1 as being actively driven and the motor M2 as being rotated by the supply spool. Under those circumstances, the voltage at the terminal 176 of the motor M2 will exceed the supply voltage (24 volts) by virtue of the back EMF of the motor M2. This voltage (30 volts, for example) is applied to the anode of the diode 94. Assuming that the diode 94 is on, its cathode voltage will be a few tenths of a volt lower than the anode voltage. Because the cathoes of both diodes 94, 92 are coupled together, they both receive the same voltage, 29.5 volts, for example. However, the voltage at the anode the diode 92 will always be less than 24 volts when the motor M1 is being actively driven and thus is back biased.

Similarly, when the motor M2 is being actively driven and the motor M1 is being rotated by the supply spool, the diode 92 will be on and the diode 94 will be back biased by the back EMF of the motor M1.

Figure 5:
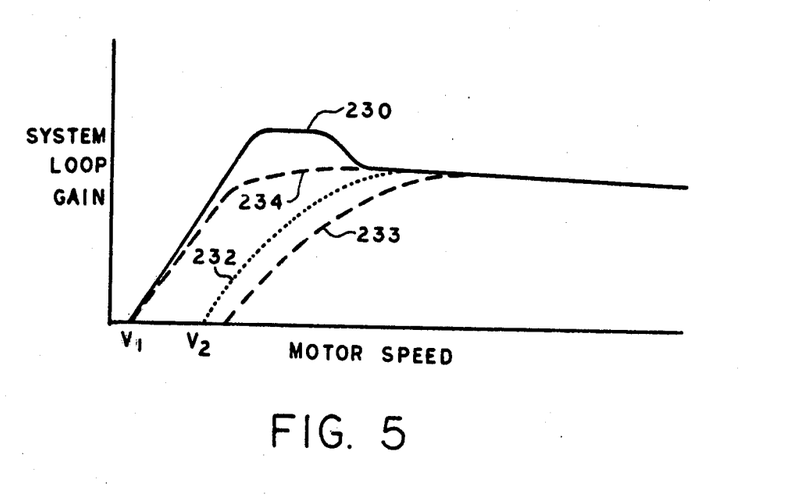
FIG. 5 illustrates a group of curves representative of system loop gain for the embodiment shown in FIGS. 3 and 4 under various conditions.
Figure 6:
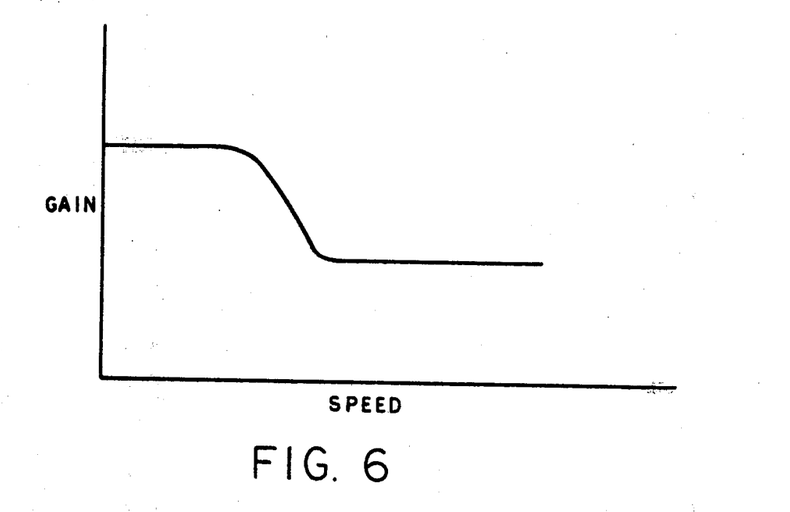
FIG. 6 is a curve illustrating the gain of a non-linear amplifier network used in the embodiment of FIG. 2.

The additional advantage obtained by combining the hold-back circuit in a control system with the non-linear amplifier network is shown in FIG. 5 which is a graphic illustration of the system loop gain vs. motor speed for three conditions. The solid line curve 230 illustrates the loop gain of the system when the non-linear amplifier network has the transfer function illustrated in FIG. 2 and the hold-back circuit is not used. FIG. 6 illustrates the gain of the non-linear amplifier network vs. motor speed. The curve 230 of FIG. 5 is generated by combining the curve of FIG. 6 with the dotted curve 232, the latter of which is representative of the transfer function of a motor-servo generator combination without the hold-back torque. As the curve 230 shows a peak may develop at a given low speed, leading to a possibly unstable condition in the system. However, when the hold-back circuit is employed, the curve 232 is modified so that it appears as curve 233. Adding curve 233 to the curve shown in FIG. 6 reduces the peak of curve 230 and results in the dashed curve 234. The curve 234 is, therefore, illustrative of the system loop gain when both the non-linear amplifier network and the hold-back circuit are employed.

FIG. 5 also indicates that a system employing the non-linear amplifier network is able to operate at a lower speed $V_1$ than the speed $V_2$ at which a comparable system not having the non-linear amplifier network can operate. Accordingly, the preferred system operates stably at low speeds as well as high speeds and is capable of operating at lower speeds than conventional systems.

The embodiment illustrated and described herein provides a control circuit which improves the operation of a servo-controlled web transport system, particularly at very low speeds. Specifically, the control circuit enhances the tracking of the servo system at very low speeds by providing additional servo gain without sacrificing system stability at higher speeds. In addition, the rotation of the drive motors and system stability are improved at low speeds by the described hold-back circuit. The described embodiment additionally ensures that the spools cannot be rotated by the servo system when an operator decouples the spools by removing the web.

Although the invention has been described in terms of a specific embodiment, many alterations and variations therein will be obvious to one skilled in the art. Accordingly, it is intended that all such alterations and variations be included within the spirit and scope of the invention as defined by the appended claims.

What is claimed is:

1. In a servo control for a web transport system in which a pair of drive motors advance a web from a supply spool to a take-up spool and a pair of servo generators generate outputs representative of the speed and direction of rotation of the spools, a control circuit responsive to the outputs of the servo generators for controlling the advancement of the web between the spools, comprising:

gain control means for summing and amplifying the outputs of the servo generators such that summed servo generator outputs whose magnitudes are less than a predetermined magnitude, representative of the spools rotating at speeds less than a predetermined low speed, are amplified to a greater extent than summed servo generator outputs whose magnitudes are greater than said predetermined magnitude;

means for generating a control voltage representative of the desired speed and direction of rotation of the spools;

means for generating a motor drive signal by algebraically summing the control voltage with the summed and amplified outputs of the gain control means; and means for selectively applying the motor drive signal to one of the drive motors for rotating its associated spool, thereby rotating the other spool by virtue of the pull exerted thereon by the web, whereby the gain of the servo control is increased at spool speeds less than the predetermined low speed and is diminished at higher spool speeds to retain stability in the servo control.

2. A control circuit as set forth in claim 1 wherein said gain control means includes first and second summing means, each receiving the outputs of the servo generators for developing corresponding first and second summed voltages representative of the algebraic sum of the outputs of the servo generators, and means for amplifying the first summed voltage when the first summed voltage is less than said predetermined magnitude, and wherein said means for generating a motor drive signal includes means for algebraically summing the control voltage with the second summed voltage and the amplified first summed voltage.

3. A control circuit as set forth in claim 2 wherein said means for amplifying said first summed voltage includes an amplifier adapted to substantially linearly amplify the first summed voltage when the latter is less than said predetermined magnitude and adapted to saturate when the first summed voltage is equal to or greater than said predetermined magnitude.

4. In a servo control for a web transport system in which a pair of drive motors advance a web from a supply spool to a take-up spool and a pair of servo generators generate outputs representative of the speed and direction of rotation of the spools, a control circuit responsive to the outputs of the servo generators for controlling the advancement of the web between the spools, comprising:

a first summing network for algebraically summing the outputs of the servo generators;

a unity gain amplifier receiving the summed outputs of the servo generators from said first summing network;

a second summing network for algebraically summing the outputs of the servo generators;

a saturable amplifier receiving the summed outputs of the servo generators from said second summing network and adapted to substantially linearly amplify the summed outputs whose magnitudes are less than a predetermined magnitude, representative of the spools rotating at speeds less than a predetermined low speed, and adapted to saturate upon reception of summed output signals whose magnitudes equal or exceed said predetermined magnitude;

means for generating a control voltage representative of the desired speed and direction of rotation of the spools;

means for generating a motor drive signal by summing the control voltage with the output of said unity gain amplifier and the output of said saturable amplifier; and means for selectively applying the motor drive signal to one of the drive motors for rotating its associated spool, thereby rotating the other spool by virtue of the pull exerted thereon by the web, whereby the gain of the servo control is increased at spool speeds less than a predetermined low speed and is diminished at higher spool speeds to retain stability in the servo control.

5. A control circuit as set forth in claim 1 further including means responsive to the control voltage being of a value which stops the rotation of the spools for inhibiting the motor drive signal from driving either motor after a predetermined interval subsequent to the control voltage reaching said value, whereby an operator removing the web from the spools after the predetermined intervals will not cause the servo system to rotate the spools by the operator's inadvertent movement of the spools and the resulting voltages generated by the servo generators.

6. A control circuit as set forth in claim 5 wherein said means for inhibiting the motor drive signal includes a timer having an input for receiving a signal indicative of the control voltage reaching said value and an output for clamping the motor drive signal to a predetermined level which inhibits motor movement.

7. A control circuit as set forth in Claim 1 further including means for applying a hold-back torque to at least one of the drive motors during low speed advancement of the web, said hold-back torque being selected to compensate for the increased loop gain of the servo control afforded by the amplification of the servo generator outputs at speeds less than said predetermined speed.

8. In a web transport system having a pair of drive motors for rotating a corresponding pair of spools for advancing a web over a wide range of speeds from the spool serving as the supply spool to the spool serving as the take-up spool, and having a servo system for controlling the speed and direction of rotation of the drive motors, a device for increasing the load on the drive motor associated with the take-up spool at very low speeds to ensure its smooth rotation at such speeds, comprising:

sensing means for detecting the torque of the drive motor associated with the take-up spool and for generating a control signal when said torque is of a value less than a predetermined low value; and means responsive to the control signal for applying a predetermined amount of hold-back torque to the drive motor associated with the supply spool, thereby applying an equivalent amount of hold-back torque to the other drive motor via the web coupled between the take-up spool and the supply spool, whereby the drive motor associated with the take-up spool is forced by the servo system to overcome the hold-back torque and, as a result, rotates smoothly until its speed increases to a point where its torque exceeds said predetermined low value of torque, whereupon the hold-back torque is removed.

9. A device as set forth in claim 8 wherein said sensing means includes an impedance serially coupled with both drive motors for developing a voltage which corresponds to the current through said drive motors, and a transistor coupled across said impedance for developing the control signal in response to the voltage across said impedance rendering said transistor conductive, whereby the control signal is developed regardless of which drive motor is energized for rotating the spool serving as the take-up spool.

10. A device as set forth in claim 9 wherein said means for applying hold-back torque includes an impedance and an electronic switch for coupling said impedance in series with the drive motor associated with the supply spool, whereby the current developed through said impedance by the back electromotive force of the drive motor associated with the supply spool creates a hold-back torque on the latter drive motor.

11. A device as set forth in claim 10 wherein the drive motors of the web transport system each have two terminals, a first terminal connected to a constant supply voltage and a second terminal for receiving a drive signal from the servo system, and wherein said electronic switch is coupled to the second terminal of one drive motor by a first diode and to the second diode of the other drive motor by a second diode, said first and second diodes being poled such that said electronic switch couples said impedance only to the drive motor associated with the supply spool by virtue of the back electromotive force generated by the latter drive motor rendering nonconductive the diode coupled to the other drive motor.

12. In a servo control for a web transport system in which a pair of drive motors advance a web from a supply spool to a take-up spool and a pair of servo generators generate outputs representative of the speed and direction of rotation of the spools, a control circuit for increasing the loop gain of the system at selected low speeds of web movement while maintaining system stability, comprising:
means for selectably amplifying the outputs of the servo generators such that servo generator outputs whose magnitude are less than a predetermined magnitude, representative of the spools rotating at speeds less than a predetermined low speed, are amplified to a greater extent than servo generator outputs whose magnitudes are greater than said predetermined magnitude;
means for generating a control voltage representative of the desired speed and direction of rotation of the spools;
means for generating a motor drive signal by combining the control voltage with the selectably amplified outputs of the servo generators;
means for selectively applying the motor drive signal to the drive motors to rotate the spools;
means for applying a hold-back torque to the drive motor of the supply spool during low speed advancement of the web, said hold-back torque being selected to compensate for the increased loop gain of the servo control afforded by the amplification of the servo generator outputs at speeds less than said predetermined speed;
whereby the gain of the servo control is increased at spool speeds less than the predetermined speed and yet oscillation of the servo control is inhibited by the compensated loop gain provided by the hold-back torque.

13. The combination as set forth in claim 12 wherein said means for applying a hold-back torque includes;
sensing means for detecting the torque of the drive motor associated with the take-up spool and for generating a control signal when said torque is of a value less than a predetermined low value; and
means responsive to the control signal for applying a predetermined amount of hold-back torque to the drive motor associated with the supply spool, thereby applying an equivalent amount of hold-back torque to the other drive motor via the web coupled between the take-up spool and the supply spool.

14. The combination as set forth in claim 13 wherein said sensing means includes an impedance serially coupled with both drive motors for developing a voltage which corresponds to the current through said drive motors, and a transistor coupled across said impedance for developing the control signal in response to the voltage across said impedance rendering said transistor conductive, whereby the control signal is developed regardless of which drive motor is energized for rotating the spool serving as the take-up spool.

* * * * *